United States Patent
Zweigle et al.

(10) Patent No.: US 10,969,628 B1
(45) Date of Patent: Apr. 6, 2021

(54) BACKLIGHT UNITS WITH SUPPORT POSTS AND CAVITY HEIGHT MONITORING

(71) Applicant: Apple Inc., Cupertino, CA (US)

(72) Inventors: Erik A. Zweigle, San Jose, CA (US);
Yu P. Sun, Yorba Linda, CA (US);
Ziruo Hong, Cupertino, CA (US);
Victor H. Yin, Cupertino, CA (US);
Eric L. Benson, San Mateo, CA (US);
Rong Liu, Sunnyvale, CA (US);
Mingxia Gu, Campbell, CA (US);
Robert J. Durand, Estero, FL (US);
Wr Jamarulan Wr Ramli, Wilayah Persekutuan Putrajaya (MY)

(73) Assignee: Apple Inc., Cupertino, CA (US)

( * ) Notice: Subject to any disclaimer, the term of this patent is extended or adjusted under 35 U.S.C. 154(b) by 346 days.

(21) Appl. No.: 15/988,978

(22) Filed: May 24, 2018

Related U.S. Application Data

(63) Continuation of application No. 15/719,412, filed on Sep. 28, 2017, now abandoned.

(51) Int. Cl.
*G02F 1/13357* (2006.01)
*G02F 1/1333* (2006.01)
*G02F 1/1335* (2006.01)

(52) U.S. Cl.
CPC .... *G02F 1/133608* (2013.01); *G02F 1/13338* (2013.01); *G02F 1/133603* (2013.01); *G02F 1/133605* (2013.01); *G02F 1/133606* (2013.01); *G02F 1/133514* (2013.01); *G02F 1/133528* (2013.01); *G02F 1/133612* (2021.01);

(Continued)

(58) Field of Classification Search
CPC .......... G02F 1/133608; G02F 1/13338; G02F 1/133603; G02F 1/133605; G02F 1/133606; G02F 1/133514; G02F 1/133621; G02F 1/133528; G02F 2001/133612;

(Continued)

(56) References Cited

U.S. PATENT DOCUMENTS 8,469,575 B2 6/2013 Weber et al.
9,240,528 B2 1/2016 Bergmann et al.
(Continued)

FOREIGN PATENT DOCUMENTS

CN 102767803 A 11/2012
CN 106371245 A 2/2017
(Continued)

*Primary Examiner* — Y M. Quach Lee
(74) *Attorney, Agent, or Firm* — Treyz Law Group, P.C.; G. Victor Treyz; David K. Cole

(57) ABSTRACT

An electronic device may have a display with a backlight. The backlight provides backlight illumination for an array of pixels that is displaying images. The backlight may include an array of cells. Each cell may contain a light source with one or more light-emitting diodes and a cavity reflector that reflects light from the light source outwardly through a diffuser for use in forming the backlight illumination. The light sources may be mounted to a printed circuit. Support posts on the printed circuit may be used to maintain the diffuser at a fixed distance from the printed circuit. The support posts may have opposing first and second ends. The first ends may be attached to the diffuser with fixed connections such as adhesive connections. The second ends may be attached to the printed circuit using floating connections.

19 Claims, 13 Drawing Sheets

(52) U.S. Cl.
CPC .. *G02F 1/133614* (2021.01); *G02F 1/133621* (2013.01); *G02F 2202/28* (2013.01); *G02F 2203/21* (2013.01)

(58) Field of Classification Search
CPC ..... G02F 2001/133614; G02F 2202/28; G02F 2203/21
See application file for complete search history.

(56) References Cited

U.S. PATENT DOCUMENTS

| | | | |
|---|---|---|---|
| 2007/0236628 A1 | 10/2007 | Epstein | |
| 2011/0304798 A1 | 12/2011 | Tanaka et al. | |
| 2012/0287376 A1* | 11/2012 | Zhang | G02F 1/133608 362/97.1 |
| 2014/0009909 A1* | 1/2014 | Shima | F21V 33/0052 362/97.1 |
| 2014/0327360 A1 | 11/2014 | Hoshino et al. | |
| 2016/0092030 A1 | 3/2016 | Byun et al. | |
| 2017/0254518 A1 | 9/2017 | Vasylyev | |
| 2018/0239197 A1* | 8/2018 | Yamano | G02F 1/133611 |
| 2019/0121201 A1* | 4/2019 | Kugimaru | F21V 17/00 |
| 2019/0258115 A1* | 8/2019 | Kyoukane | G02F 1/133603 |

FOREIGN PATENT DOCUMENTS

| | | |
|---|---|---|
| EP | 3121645 A1 | 1/2017 |
| JP | 2009150981 A | 7/2009 |
| JP | 2010009950 A | 1/2010 |
| JP | 2010272245 A | 12/2010 |
| JP | 3170916 U | 10/2011 |
| JP | 2012004067 A | 1/2012 |
| JP | 2014220035 A | 11/2014 |
| KR | 1020050116641 A | 12/2005 |
| KR | 1020080093220 A | 10/2008 |
| KR | 20130070772 A | 6/2013 |
| KR | 20150065318 A | 6/2015 |
| TW | 200842448 A | 11/2008 |
| TW | 201013263 A | 4/2010 |
| TW | 201116764 A | 5/2011 |
| TW | I393959 B | 4/2013 |
| TW | 201405213 A | 2/2014 |
| TW | I526740 B | 3/2016 |
| TW | I538603 B | 6/2016 |
| WO | 2017038082 A1 | 3/2017 |

* cited by examiner

BACKLIGHT UNITS WITH SUPPORT POSTS AND CAVITY HEIGHT MONITORING

This application is continuation of U.S. patent application Ser. No. 15/719,412, filed Sep. 28, 2017, which is hereby incorporated by reference herein in its entirety.

BACKGROUND

This relates generally to displays, and, more particularly, to backlit displays.

Electronic devices often include displays. For example, computers and cellular telephones are sometimes provided with backlit liquid crystal displays. Edge-lit backlight units have light-emitting diodes that emit light into an edge surface of a light guide plate. The light guide plate then distributes the emitted light laterally across the display to serve as backlight illumination. Direct-lit backlight units have arrays of light-emitting diodes that emit light vertically through the display.

Direct-lit backlights may have locally dimmable light-emitting diodes that allow dynamic range to be enhanced. If care is not taken, however, the light produced by a direct-lit backlight may not be sufficiently uniform. For example, variations in the distance between the light-emitting diodes and an overlapping diffuser layer may lead to undesired uniformity variations in a backlight.

SUMMARY

An electronic device may have a display with a backlight. The backlight provides backlight illumination for an array of pixels that is displaying images. The backlight may include an array of backlight cells. Each cell may contain a light source with one or more light-emitting diodes and a cavity reflector that reflects light from the light source outwardly through a diffuser for use in forming the backlight illumination.

The light sources may be mounted to a printed circuit. Support posts may be used to maintain the diffuser at a fixed distance from the printed circuit. The support posts may have opposing first and second ends. The first ends may be attached to the diffuser with fixed connections such as adhesive connections. The second ends may be attached to the printed circuit using floating connections. The floating connections may allow the second ends to shift laterally relative to the printed circuit to accommodate mismatch in the coefficients of thermal expansion between the diffuser and the printed circuit.

DETAILED DESCRIPTION

Figure 1:
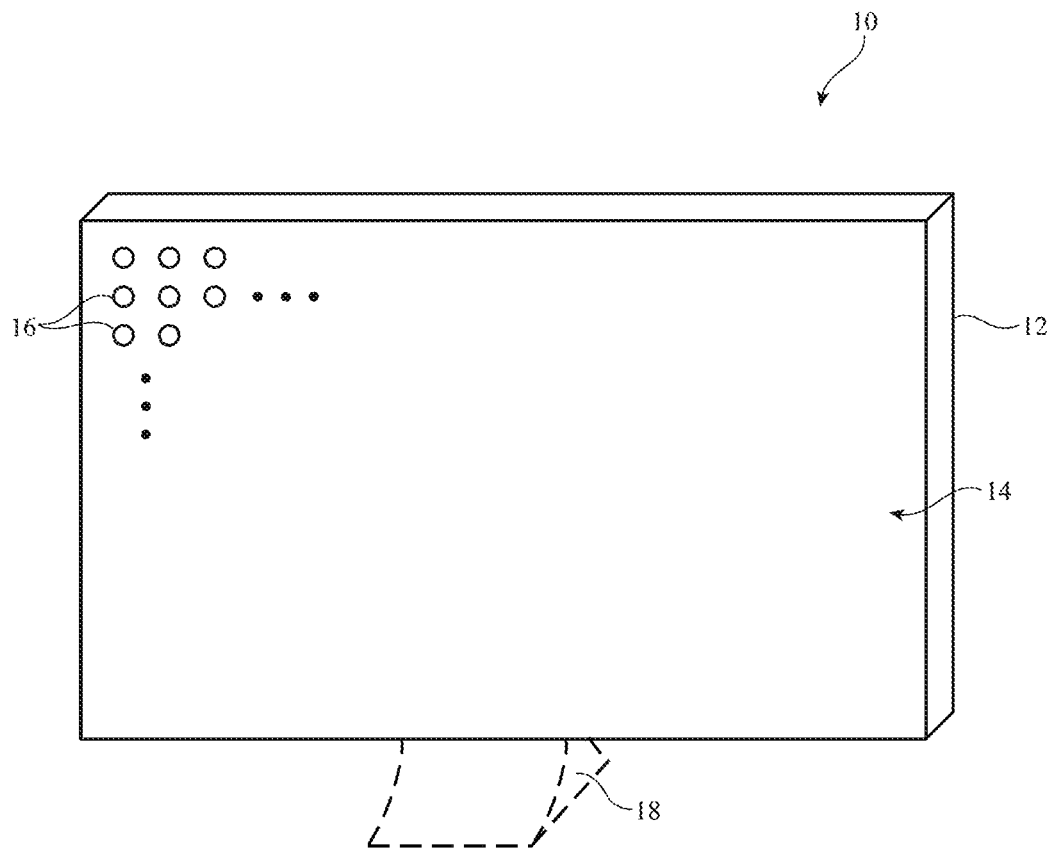
FIG. 1 is a diagram of an illustrative electronic device having a display in accordance with an embodiment.

Electronic devices may be provided with backlit displays. The backlit displays may include liquid crystal pixel arrays or other display structures that are backlit by light from a direct-lit backlight unit. A perspective view of an illustrative electronic device of the type that may be provided with a display having a direct-lit backlight unit is shown in FIG. 1. Electronic device 10 of FIG. 1 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, device 10 may have a display such as display 14. Display 14 may be mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Housing 12 may have a stand such as optional stand 18, may have multiple parts (e.g., housing portions that move relative to each other to form a laptop computer or other device with movable parts), may have the shape of a cellular telephone or tablet computer (e.g., in arrangements in which stand 18 is omitted), and/or may have other suitable configurations. The arrangement for housing 12 that is shown in FIG. 1 is illustrative.

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of pixels 16 formed from liquid crystal display (LCD) components or may have an array of pixels based on other display technologies. A cross-sectional side view of display 14 is shown in FIG. 2.

Figure 2:
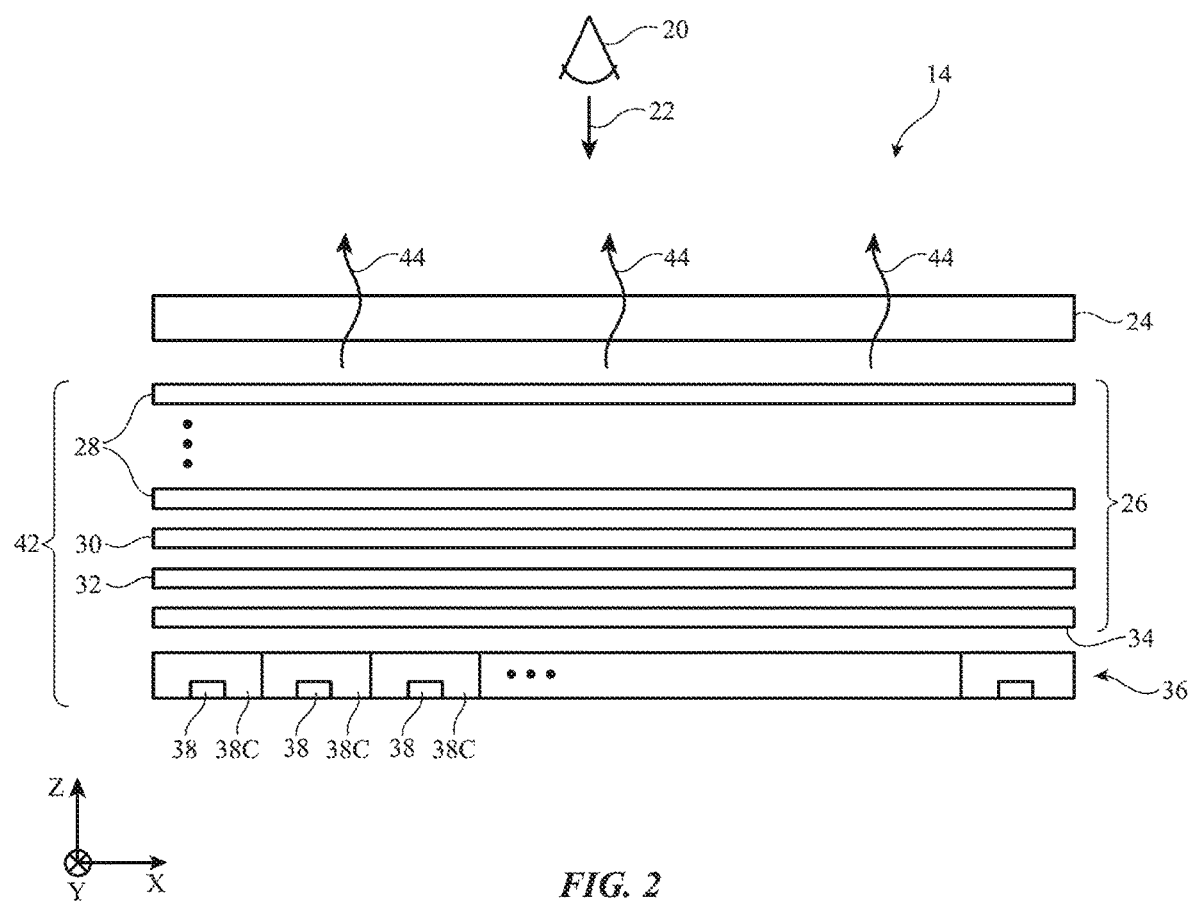
FIG. 2 is a cross-sectional side view of an illustrative display in accordance with an embodiment.

As shown in FIG. 2, display 14 may include a pixel array such as pixel array 24. Pixel array 24 may include an array of pixels such as pixels 16 of FIG. 1 (e.g., an array of pixels having rows and columns of pixels 26). Pixel array 24 may be formed from a liquid crystal display module (sometimes referred to as a liquid crystal display or liquid crystal layers) or other suitable pixel array structures. A liquid crystal display for forming pixel array 24 may, as an example, include upper and lower polarizers, a color filter layer and a thin-film transistor layer interposed between the upper and lower polarizers, and a layer of liquid crystal material interposed between the color filter layer and the thin-film transistor layer. Liquid crystal display structures of other types may be used in forming pixel array 24, if desired.

During operation of 14, images may be displayed on pixel array 24. Backlight unit 42 (which may sometimes be referred to as a backlight, backlight layers, backlight structures, a backlight module, a backlight system, etc.) may be used in producing backlight illumination 44 that passes through pixel array 24. This illuminates any images on pixel array 24 for viewing by a viewer such as viewer 20 who is viewing display 14 in direction 22.

Backlight unit 42 may have optical films 26, a light diffuser such as light diffuser (light diffuser layer) 34, and light source array 36. Light source array 36 may contain a two-dimensional array of light sources 38. Each light source 38 may contain one or more light-emitting diodes and may be associated with a respective one of backlight cells 38C. Cells 38C may contain reflectors for reflecting light through pixel array 24. Cells 38C may be arranged in an array with rows and columns in the X-Y plane of FIG. 2.

Light sources 38 in cells 38C may be controlled in unison by control circuitry in device 10 or may be individually controlled (e.g., to implement a local dimming scheme that helps improve the dynamic range of images displayed on pixel array 24). The light produced by each cell 38C may travel upwardly along dimension Z through light diffuser 34 and optical films 26 before passing through pixel array 24. Light diffuser 34 may contain light-scattering structures that diffuse the light from light-emitting diode array 36 and thereby help provide uniform backlight illumination 44. Optical films 26 may, as an example, include films such as dichroic filter 32, phosphor layer 30, and films 28. Films 28 may include brightness enhancement films that help to collimate light 44 and thereby enhance the brightness of display 14 for user 20 and/or other optical films (e.g., compensation films, etc.).

The light-emitting diodes of light sources 38 may emit light of any suitable color. With one illustrative configuration, the light-emitting diodes emit blue light. Dichroic filter layer 32 may be configured to pass blue light from light-emitting diodes 38 while reflecting light at other colors. Blue light from light-emitting diodes 38 may be converted into white light by a photoluminescent material such as phosphor layer 30 (e.g., a layer of white phosphor material or other photoluminescent material that converts blue light into white light). If desired, other photoluminescent materials may be used to convert blue light to light of different colors (e.g., red light, green light, white light, etc.). For example, layer 30 (which may sometimes be referred to as a photoluminescent layer or color conversion layer) may include quantum dots that convert blue light into red and green light (e.g., to produce white backlight illumination that includes, red, green, and blue components, etc.). Configurations in which light-emitting diodes 38 emit white light (e.g., so that layer 30 may be omitted, if desired) and/or in which light-emitting diodes 38 emit blue or ultraviolet pump light for pixels containing quantum dots may also be used.

In configurations in which layer 30 emits white light such as white light produced by phosphorescent material in layer 30, white light that is emitted from layer 30 in the downwards (−Z) direction may be reflected back up through pixel array 24 as backlight illumination by dichroic filter layer 32 (i.e., layer 32 may help reflect backlight outwardly away from array 36). In configurations in which layer 30 includes, for example, red and green quantum dots, dichroic filter 32 may be configured to reflect red and green light from the red and green quantum dots, respectively to help reflect backlight outwardly away from array 36. By placing the photoluminescent material of backlight 42 (e.g., the material of layer 30) above diffuser layer 34, light-emitting diodes 38 may be configured to emit more light towards the edges of the light-emitting diode cells (tiles) of array 36 than at the centers of these cells, thereby helping enhance backlight illumination uniformity.

Figure 3:
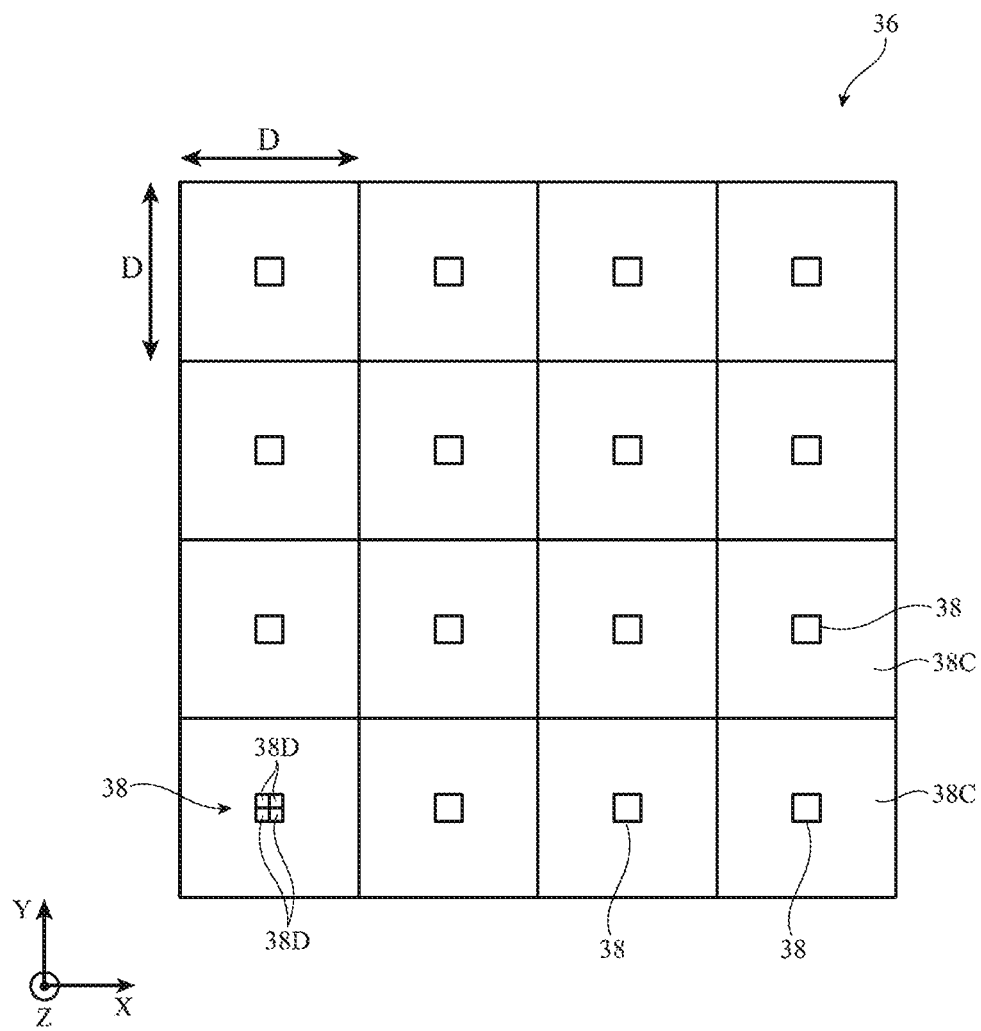
FIG. 3 is a top view of an illustrative backlight cell array having rows and columns of light source cells for a direct-lit backlight unit in accordance with an embodiment.

FIG. 3 is a top view of an illustrative light source array for backlight 42. As shown in FIG. 3, array 36 may contain row and columns of light-sources 38. Each light source 38 may be associated with a respective cell 38C. The length D of the edges of cells 38C may be 2 mm, 18 mm, 1-10 mm, 1-4 mm, 10-30 mm, more than 5 mm, more than 10 mm, more than 15 mm, more than 20 mm, less than 25 mm, less than 20 mm, less than 15 mm, less than 10 mm, or other suitable size. If desired, hexagonally tiled arrays and arrays with light sources 38 that are organized in other suitable array patterns may be used. In arrays with rectangular cells, each cell may have sides of equal length (e.g., each cell may have a square outline in which four equal-length cell edges surround a respective light-emitting diode) or each cell may have sides of different lengths (e.g., a non-square rectangular shape). The configuration of FIG. 3 in which array 36 has rows and columns of square light-emitting regions such as cells 38C is merely illustrative.

If desired, each cell 38C may have a light source that is formed from an array of light-emitting diode dies (e.g., multiple individual light-emitting diodes 38D arranged in an array such as a 2×2 cluster of light-emitting diodes forming a four-die light source 38 at the center of each cell 38C). This type of configuration is illustrated by light source 38 in the leftmost and lowermost cell 38C of FIG. 3, which has been formed from a 2×2 array of light-emitting diodes 38D (e.g., four separate light-emitting diode dies). The diodes 38D in light source 38 in the lower left corner of array 36 of FIG. 3 may be mounted on a common package substrate, may be mounted on a printed circuit board substrate that extends across array 36, or may be mounted in array 36 using other suitable arrangements. In general, each cell 38C may include a light source 38 with a single light-emitting diode 38D, a pair of light-emitting diodes 38D, 2-10 light-emitting diodes 38D, at least two light-emitting diodes 38D, at least 4 light-emitting diodes 38D, at least eight light-emitting diodes 38D, fewer than five light-emitting diodes 38D, or other suitable number of light-emitting diodes.

Figure 4:
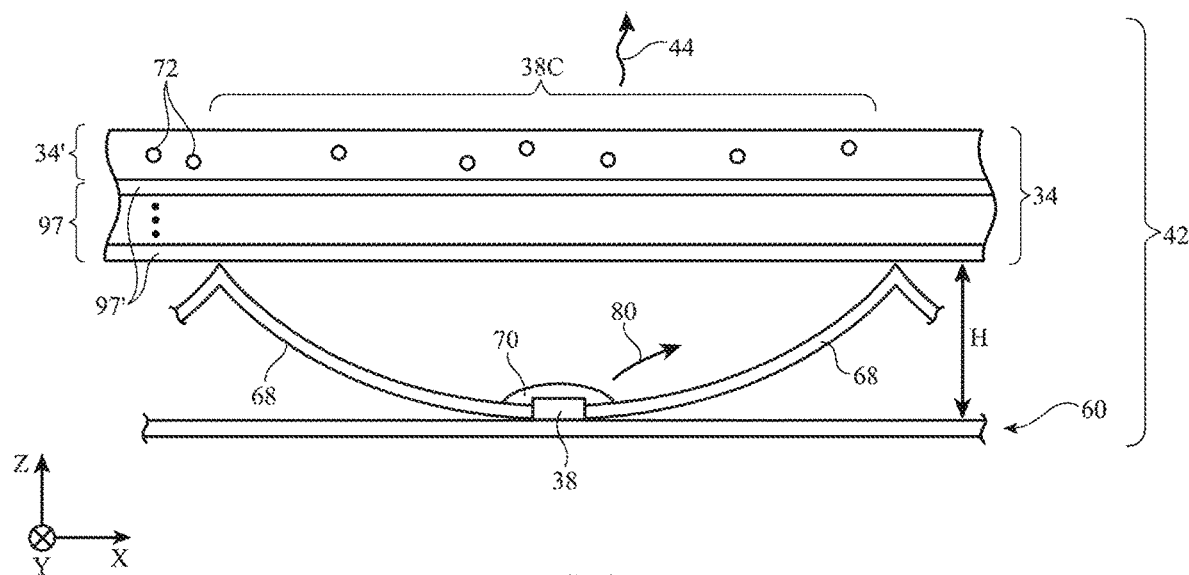
FIG. 4 is a cross-sectional side view of an illustrative light source such as a light-emitting diode in a cavity reflector of a backlight cell in accordance with an embodiment.

FIG. 4 is a cross-sectional side view of an illustrative backlight cell 38C in backlight 42. As shown in FIG. 4, each cell 38C in array 36 may have a reflector such as cavity reflector 68. Reflector 68 may have a square outline (i.e., a square footprint when viewed from above) or may have other suitable shapes and may be formed from sheet metal (e.g., stamped sheet metal), metallized polymer film, a thin-film metal on a plastic carrier, a dielectric thin-film stack that forms a dielectric mirror (a thin-film interference mirror) on a polymer film or molded plastic carrier, a white reflective film (e.g., a glossy white polymer sheet formed from a white ink layer or other white layer on a polymer carrier covered with a glossy coating such as a glossy polymer coating), or other suitable reflector structure.

An opening may be formed in reflector 68 in each cell 38C to accommodate a respective light source 38. The light source 38 in each cell may have an upper portion that protrudes through the opening in reflector 68 and a lower portion with contacts that are soldered or otherwise mounted to metal traces in printed circuit 60.

The reflectors in cells 38C may have cross-sectional profiles with curved portions to help reflect light from light sources 38 upwards as backlight illumination 44. With one illustrative configuration, a polymer film (e.g., a film coated with a dielectric thin-film interference mirror surface or a glossy white reflective surface) may be embossed using a roller (e.g., the film may be thermoformed using patterned structures on a heated roller). Following thermoforming operations to form the curved walls of reflector 68 in each cell 38C, a die cutting tool or other cutting apparatus may cut openings for each of light sources 38.

As shown in FIG. 4, a transparent structure such as transparent dome structure 70 may be formed over each light source 38 to help laterally distribute light 80 that has been emitted by that light source. Dome structure 70 may be formed from a bead of clear silicone or other transparent polymer (as an example). During operation, light source 38 emits light 80 that is refracted away from the Z axis by dome structure 70.

Some rays of light 80 are oriented at relatively large angles with respect to the Z axis of FIG. 4. These off-axis rays of light 80 are reflected upwardly in direction Z from reflector 68. Other rays of light 80 are oriented at smaller angles with respect to the Z axis (surface normal of display 14). If desired, backlight 42 may include an optional filter layer with an angularly dependent light transmission characteristic such as filter layer 97. Diffuser layer 34 may include light-diffusing layer 34'. Layer 34' may include light-scattering particles such as particles 72 in a polymer binder and/or may have other light-scattering structures for diffusing light 80 from light sources 38. Filter layer 97 may be a thin-film interference filter formed from multiple dielectric layers 97' or other suitable filter with an angularly dependent light transmission characteristic. Filter layer 97 may be formed on a substrate that is separate from layer 34' or may be formed on layer 34' in diffuser 34 as shown in the illustrative configuration of FIG. 4.

The layers of display 14 may not be perfectly flat due to external pressure, due to expansion and/or contraction caused by thermal fluctuations, and/or due to manufacturing variations. This may create undesired fluctuations in the separation distance H (sometimes referred to as optical distance H) between printed circuit 60 and diffuser 34. With one illustrative configuration, display 14 may include an array of supporting posts in backlight 42 that help maintain a desired fixed value for height H across display 14.

Figure 5:
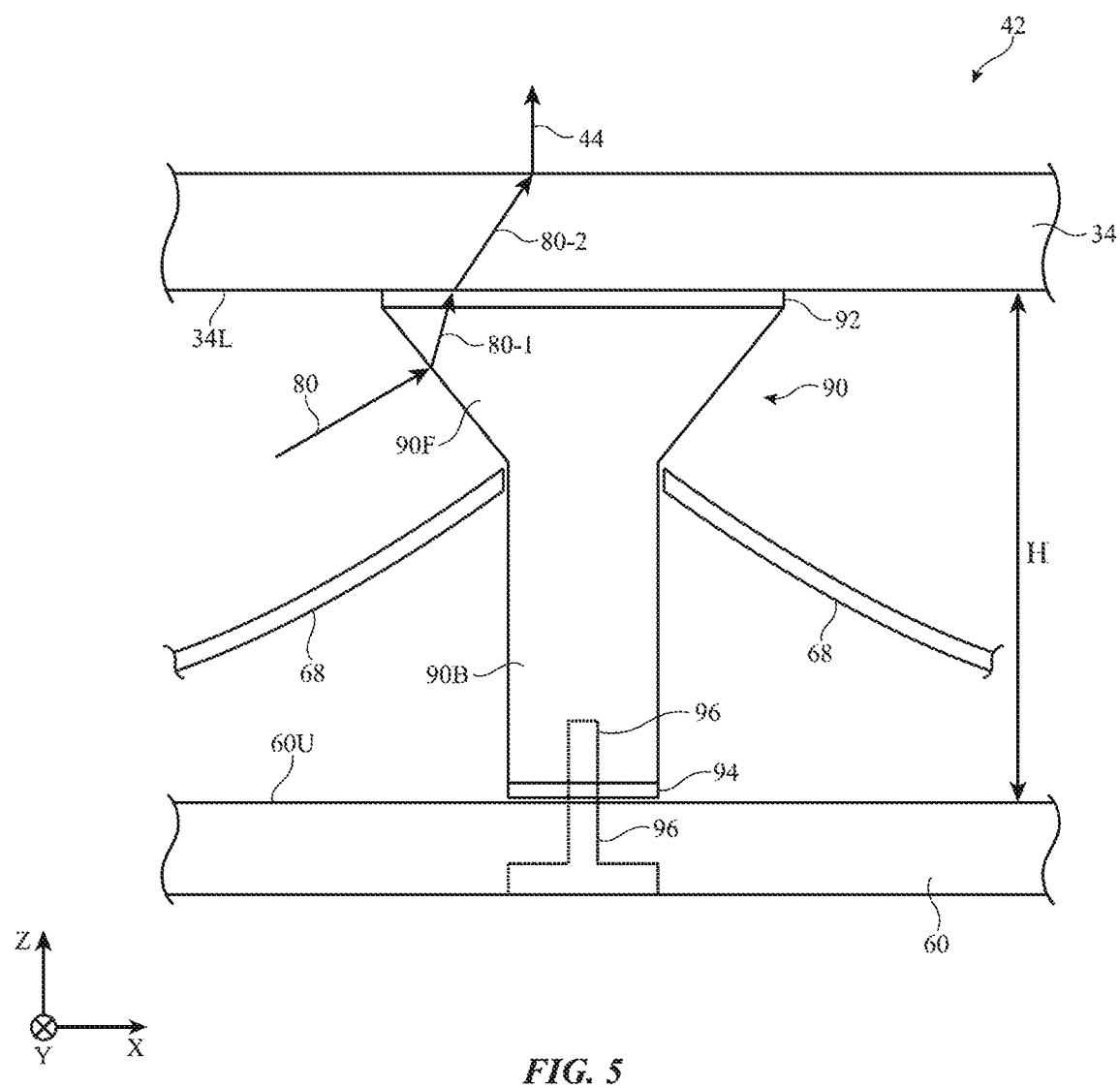
FIG. 5 is a cross-sectional side view of an illustrative transparent support post for a backlight in accordance with an embodiment.

FIG. 5 is a cross-sectional side view of an illustrative portion of backlight 42 showing how backlight 42 may include a support post. As shown in FIG. 5, support post 90 may extend between the upper surface 60U of printed circuit 60 and the opposing lower surface (surface 34L) of diffuser 34 (as an example). Posts 90 may be cylindrical (radially symmetric) or may have other shapes (e.g., shapes in which one or more sides of posts 90 have flat portions). Radially symmetric arrangements for posts 90 may help to reduce shadows.

The presence of support posts such as support post 90 of FIG. 5 may help maintain a fixed separation height H between diffuser 34 and printed circuit 60 and may therefore help to stabilize the vertical separation between light sources 38 in array 36 and diffuser 34. This stabilization will help reduce fluctuations in light intensity that might otherwise result in hotpots and dark zones in areas of display 14.

As shown in FIG. 5, support post 90 may have a lower portion such as lower portion 90B and an upper portion such as upper portion 90F. Portion 90B may have straight sides (e.g., portion 90B may be a cylinder) and portion 90F may be tapered outwardly (e.g., portion 90F may have an inverted cone shape). Reflector 68 may have an array of openings with each opening receiving a respective support post 90. There may be a support post at each corner of each cell 38C or support posts 90 may be more sparsely arrayed in backlight 42 (e.g., to accommodate separation height measurement sensors, etc.).

Support post 90 of FIG. 5 may be attached to layer 60 using adhesive 94 and/or using a screw such as screw 96. Screw 96 may have a shaft that passes through an opening in printed circuit substrate 60 and engages threads in a threaded opening in portion 90B of post 90. Upper portion 90F of post 90 may be attached to diffuser 34 using adhesive 92. To prevent dark spots from forming on backlight 42 due to the presence of posts 90, post 90 may be formed from a transparent material such a clear polymer. Adhesive 92 may also be formed from a clear material (e.g., a clear polymer). During operation, light 80 from light source 38 may strike portion 90F of post 90 and may be redirected within post 90 as illustrated by light ray 80-1 (e.g., by refraction). Refraction at the interface between post 90 and diffuser 34 may cause light ray 80-2 to be angled at a non-zero angle with respect to light ray 80-1 and refraction at the interface between diffuser 34 and air (or other materials) above diffuser 34 may cause light ray 44 (e.g. the backlight illumination exiting diffuser 34) to be angled at a non-zero angle with respect to light ray 80-2. Light 80-2 may also be scattered by scattering features in diffuser 34. The flared shape of portion 90F and the transparency of portion 90F may help guide off-axis light rays such as illustrative ray 80 over post 90, so that illumination 44 is present over post 90. As a result, local dark spots in backlight illumination 44 due to the presence of posts 90 may be reduced or eliminated.

Figure 6:
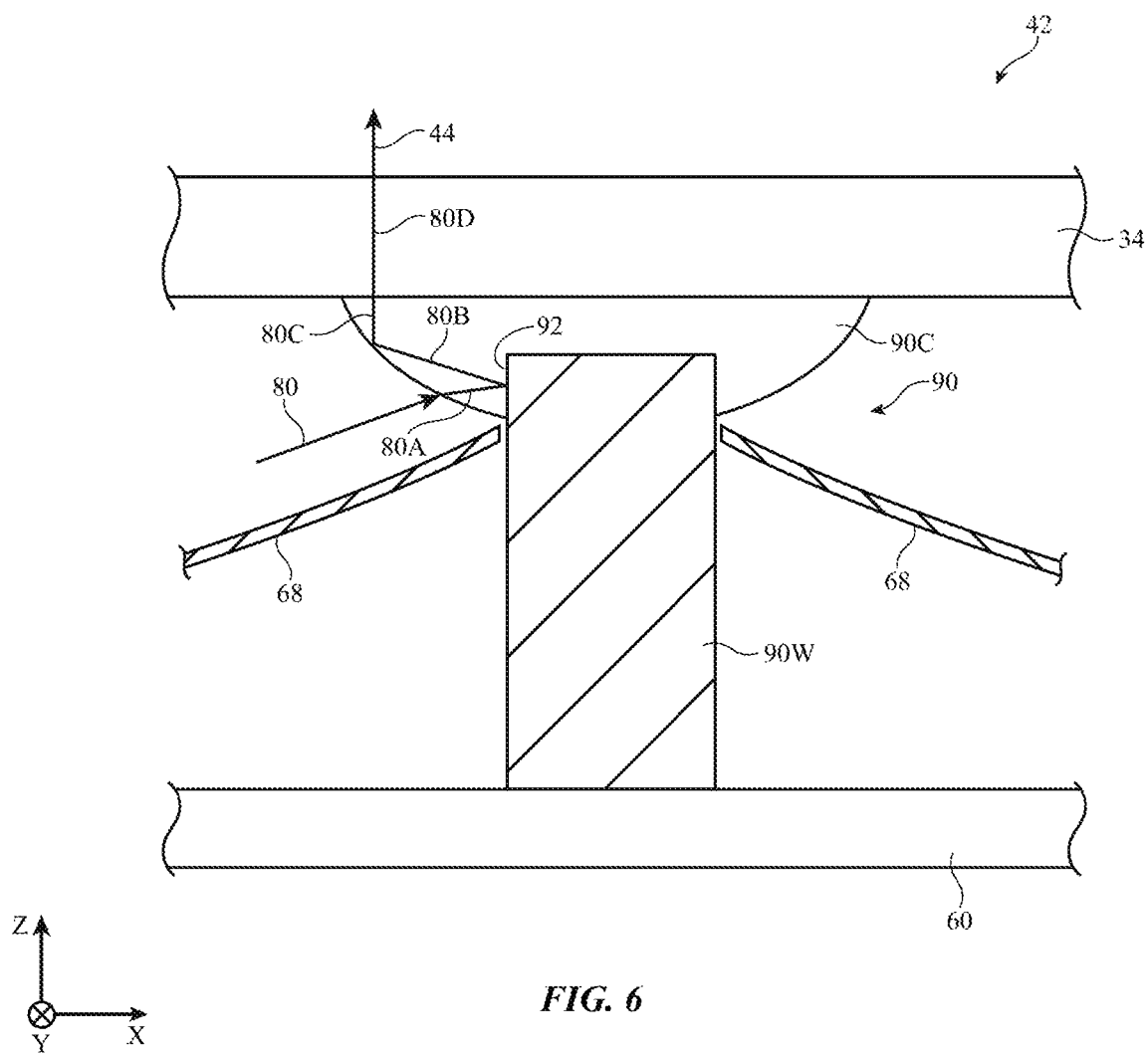
FIG. 6 is a cross-sectional side view of an illustrative support post having a white shot of plastic that is at least partly covered by a clear shot of plastic in accordance with an embodiment.

Other configurations for supporting diffuser 34 in backlight 42 may be used, if desired. In the illustrative configuration of FIG. 6, post 90 includes multiple shots of plastic. A first shot of plastic such as a white polymer is used in forming lower post portion 90W. A second shot of plastic, which is formed at least partly on top of portion 90W is used in forming upper post portion 90C. Portion 90C may be transparent (e.g., portion 90C may be formed from clear polymer). With this type of configuration, a light ray such as illustrative off-axis light ray 80 may enter clear portion 90C and refract to form light ray 80A. Light ray 80A may reflect off of reflective white surface 92 of portion 90W to form reflected ray 80B. Ray 80B may reflect from the inner surface of portion 90C (e.g., the interface between portion 90C and surrounding air in the space between diffuser 34 and printed circuit 60) in accordance with the principal of total internal reflection, thereby forming reflected ray 80C. Ray 80C may enter diffuser 34 and, following passage through diffuser 34 and possible scattering by diffuser 34, can exit diffuser 34 as backlight illumination 44. Different rays may take different paths through post 90 and layer 34. Nevertheless, as the illustrative path of ray 80 of FIG. 6 demonstrates, the presence of white portion 90W of post 90 may help to reflect light so that light is not absorbed and lost at post 90 and the presence of clear portion 90C may help redirect light above post 90 to serve as illumination 44. As a result, post structures of the type shown in FIG. 6 may help reduce dark spots that might otherwise arise from incorporating supports into backlight 42.

Figure 7:
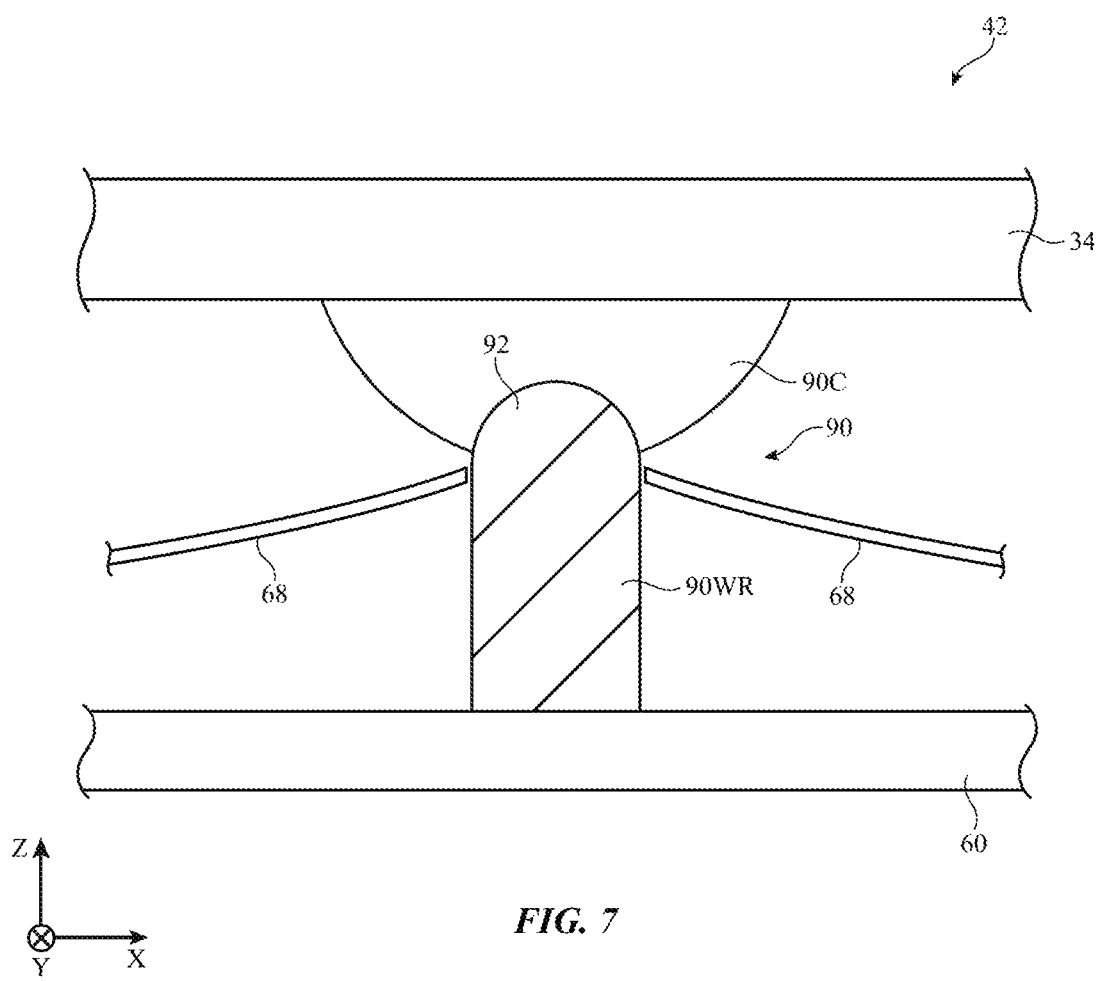
FIG. 7 is a cross-sectional side view of a portion of an illustrative support post having a white shot of plastic with a rounded tip that is at least partly covered by a clear shot of plastic in accordance with an embodiment.

In the illustrative configuration of FIG. 7, post 90 includes portion 90WR (e.g., a white polymer portion) and portion 90C (e.g., a clear polymer portion). Surface 92 of post portion 90WR is rounded. This shape may help redirect light upwards through diffuser 34 (e.g., less light may be reflected laterally and more light may be reflected upwards). Portion 90C can be flared (tapered) outwardly (e.g., so that the top of portion 90C adjacent to diffuser 34 is wider than the bottom of portion 90C adjacent to post portion 90WR) so as to facilitate the redirection of light that passes through portion 90C upwards through diffuser 34. Other shapes may be used for post portions 90WR and 90C if desired. The configuration of FIG. 7 is merely illustrative.

Figure 8:
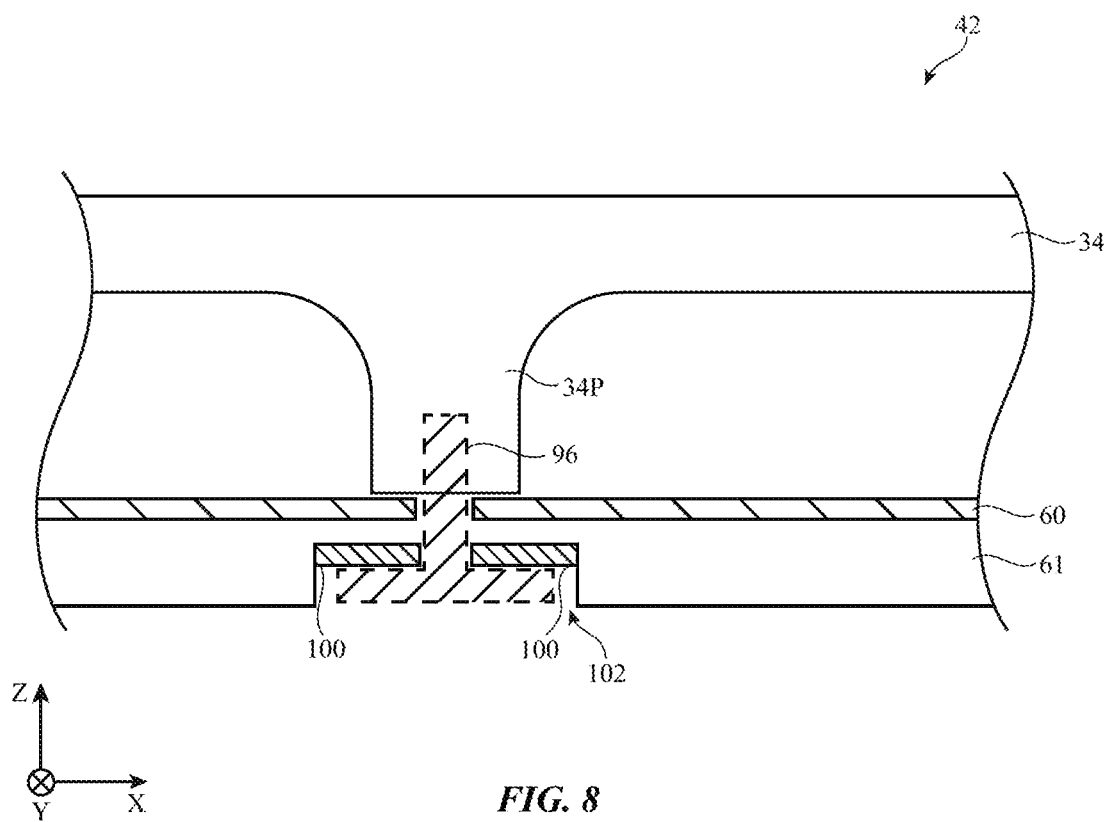
FIG. 8 is a cross-sectional side view of a portion of an illustrative diffuser layer with a support post of the type that may be formed form an integral portion of the diffuser layer in accordance with an embodiment.

As shown in FIG. 8, support posts for backlight 42 may be formed from integral portions of diffuser 34. In the example of FIG. 8, portion 34P of diffuser 34 is serving as a support post and extends between the lower surface of diffuser 34 and the opposing upper surface of printed circuit 60. Portion 34P may be formed from the same material(s) as diffuser 34 and may, for example, be formed by molding a diffuser 34 with integral support posts 34P so that these integral support posts are protrusions from the planar portion of diffuser 34. Configurations in which posts such as post 34P of FIG. 8 are formed separately from diffuser 34 and attached to diffuser 34 (e.g., using adhesive or other attachment mechanisms) may also be used. Support post 34P may be formed from clear or translucent plastic (e.g., transparent polymer, transparent polymer with light-scattering particles or other light-scattering features, etc.). The lower portion of support post 34P may be cylindrical and the upper portion of support post 34P may have a curved outwardly flared profile. Other shapes may be used for integral support posts such as support post 34P, if desired.

Support post 34P may be attached to printed circuit 60 using adhesive, a screw, or other attachment mechanisms. Printed circuit 60 may overlap a metal backlight chassis layer such as metal chassis 61 or other suitable support structure. This type of arrangement may be used in backlight 42 whenever it is desired to provide additional support for the layers of backlight 42.

In the example of FIG. 8, support post 34P is configured to receive a screw such as screw 96 (e.g., support post 34P may have a threaded opening that receives a threaded shaft portion of screw 96). Elastomeric gasket 100 (e.g., a ring-shaped washer) may be received in opening 102 of metal chassis 61. The shaft of screw 96 may pass through an opening in gasket 100 and an opening in layer 60 (e.g., an opening that is wider than the shaft of screw 96). The presence of gasket 100 between a head portion of screw 96 and metal chassis 61 may help accommodate lateral mismatch between the locations of posts 34P and the locations of openings 102 in printed circuit 60 (e.g., to satisfy alignment tolerances, to accommodate lateral shifts due to thermal expansion and contraction, etc.).

Figure 9:
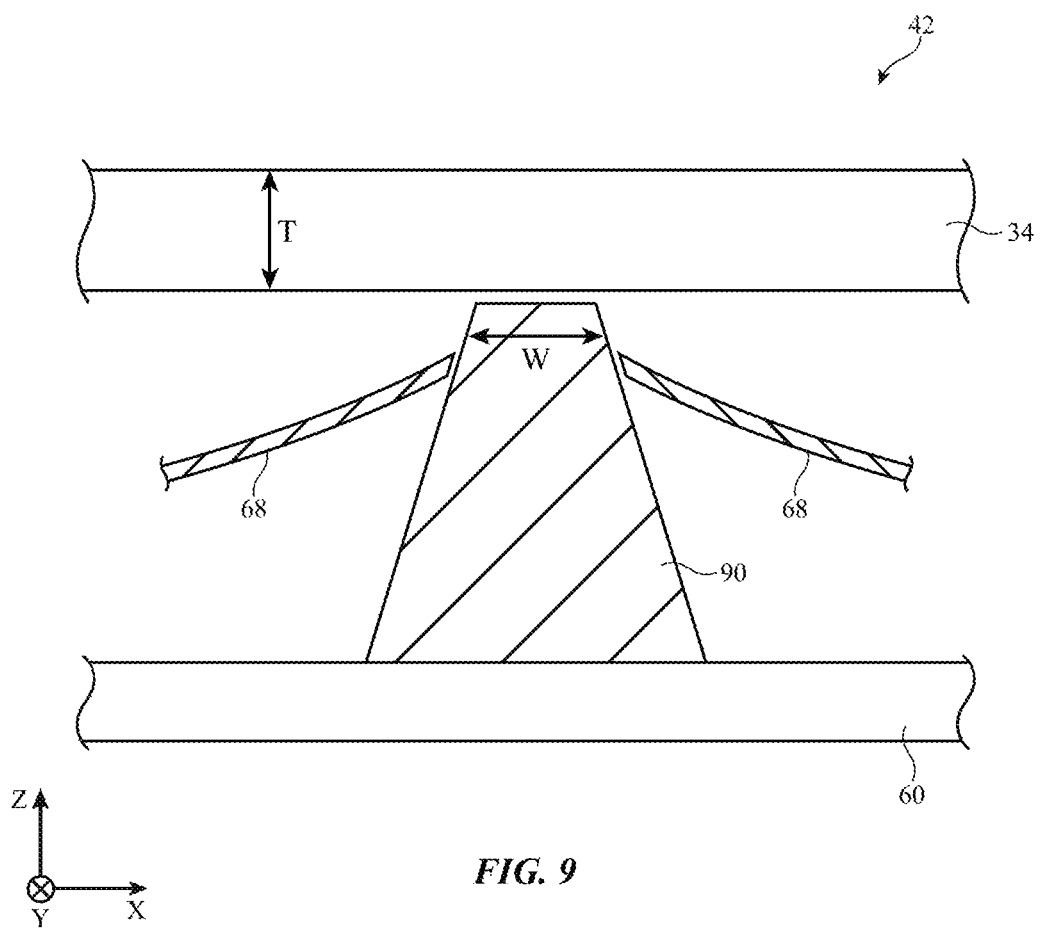
FIG. 9 is a cross-sectional side view of an illustrative support post for a backlight having an inverted cone shape in accordance with an embodiment.

As shown in FIG. 9, support post 90 (e.g., a clear polymer support post, a white polymer support post, etc.) may have an inverted cone shape or other configuration that minimizes the size (diameter W) of the upper portion of post 90 where post 90 contacts diffuser 34. In configurations in which the ratio of diffuser thickness T to post top diameter W is sufficient (e.g., at least 1, at least 2, at least 3, less than 100, etc.), shadowing of light from light sources 38 will be minimized and the presence of posts 90 will not significantly disrupt the uniformity of emitted backlight illumination 44.

In configurations in which one end of support post 90 has a fixed connection (e.g., a fixed connection to diffuser 34) whereas another end of support post 90 has a floating connection (e.g., to printed circuit 60), mismatch in the coefficients of thermal expansion for diffuser 34 and printed circuit 60 may be accommodated.

Figure 10:
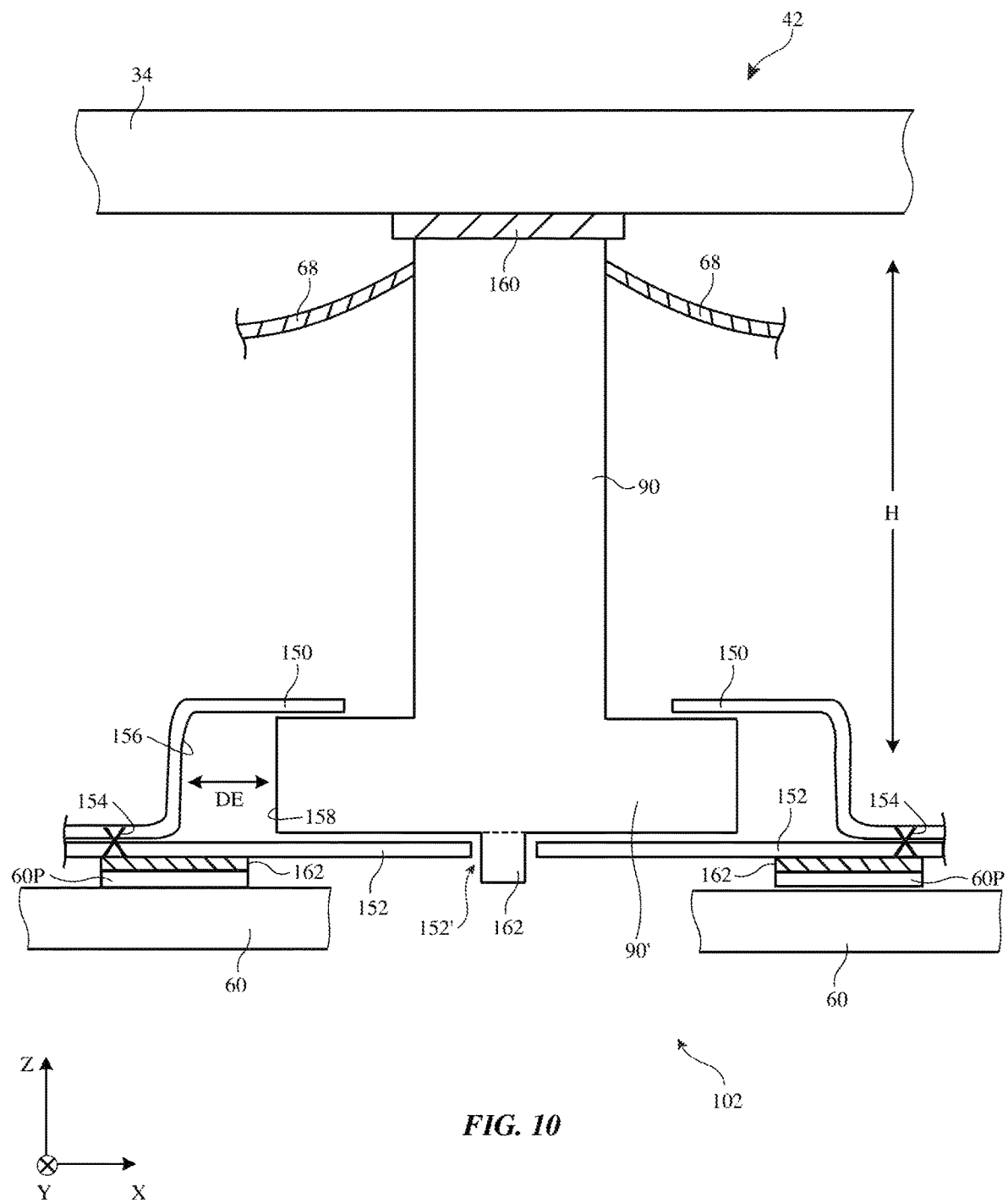
FIG. 10 is a cross-sectional side view of an illustrative support post for a backlight having a floating connection to a substrate in accordance with an embodiment.

In the example of FIG. 10, support post 90 has a widened lower portion 90'. Portion 90' is captured in a floating connection structure. As shown in FIG. 10, portion 90' is captured in a gap between a portion of upper member 150 (e.g., a top metal plate) and a corresponding portion of lower member 152. Upper member 150 and lower member 152 may be attached to each other using welds, solder, adhesive, fasteners, or other coupling mechanisms (see, e.g., welds 154 of FIG. 10). Upper portion 90" of support post 90 is connected to the lower surface of light diffuser 34 (sometimes referred to as a light diffuser panel, light diffuser sheet, or light diffuser layer) using adhesive 160 (e.g., pressure sensitive adhesive). Lower member 152, which is connected to upper member 150 may be attached to a substrate such as printed circuit 60 using solder 162 and solder pads 60P on printed circuit 60 or other suitable attachment mechanisms. Light diffuser 34 and printed circuit 60 may be formed from materials that have different coefficients of thermal expansion. To accommodate relative lateral movement between light diffuser 34 and printed circuit 60, the connection formed between post 90 and printed circuit 60 may have a floating configuration.

With the illustrative floating configuration of FIG. 10, lateral space DE is provided between inner surface 156 of member 150 and outer surface 158 of widened portion 90' of post 90. This allows post 90 to move laterally in dimensions X and Y to accommodate differences in the coefficient of thermal expansion between diffuser 34 and printed circuit 60.

During manufacturing, a sacrificial alignment structure 162 may be attached to the lower surface of post 90 within corresponding opening 152' of lower member 152. Alignment structure 162 may help post 90 to center itself within opening 102 during assembly and gluing operations as post 90 is mounted into the cavity formed between upper member 150 and lower member 152 and breaks off during subsequent use.

Figure 11:
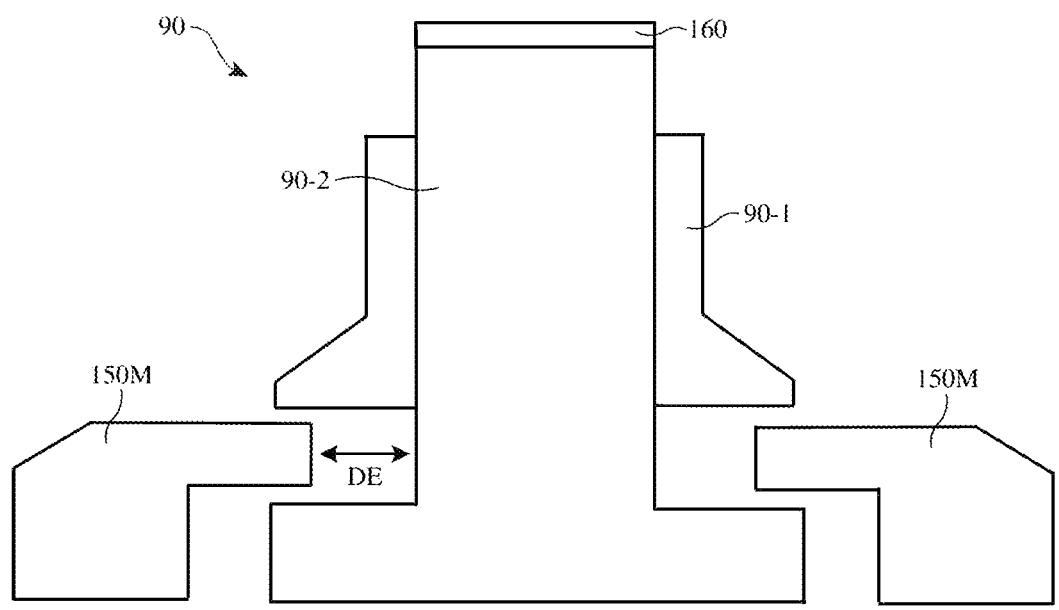
FIG. 11 is a cross-sectional side view of an illustrative support post for a backlight having a floating connection in accordance with an embodiment.

In the illustrative floating connection configuration of FIG. 11, support post 90 is formed from an outer member 90-1 that receives and surrounds inner member 90-2. Members 90-1 and 90-2 have corresponding surfaces 166 and 168 that capture member 150M. Member 150M may be coupled to a substrate such as printed circuit 60 or other support structures (e.g., using adhesive, solder, welds, etc.). Adhesive 160 may be used to couple support post 90 to light diffuser 34. Inner surface 170 of member 150M and outer surface 172 of member 90-2 may be separated by lateral space DE to accommodate coefficient of thermal expansion mismatch, as described in connection with space DE of FIG. 10.

Figure 12:
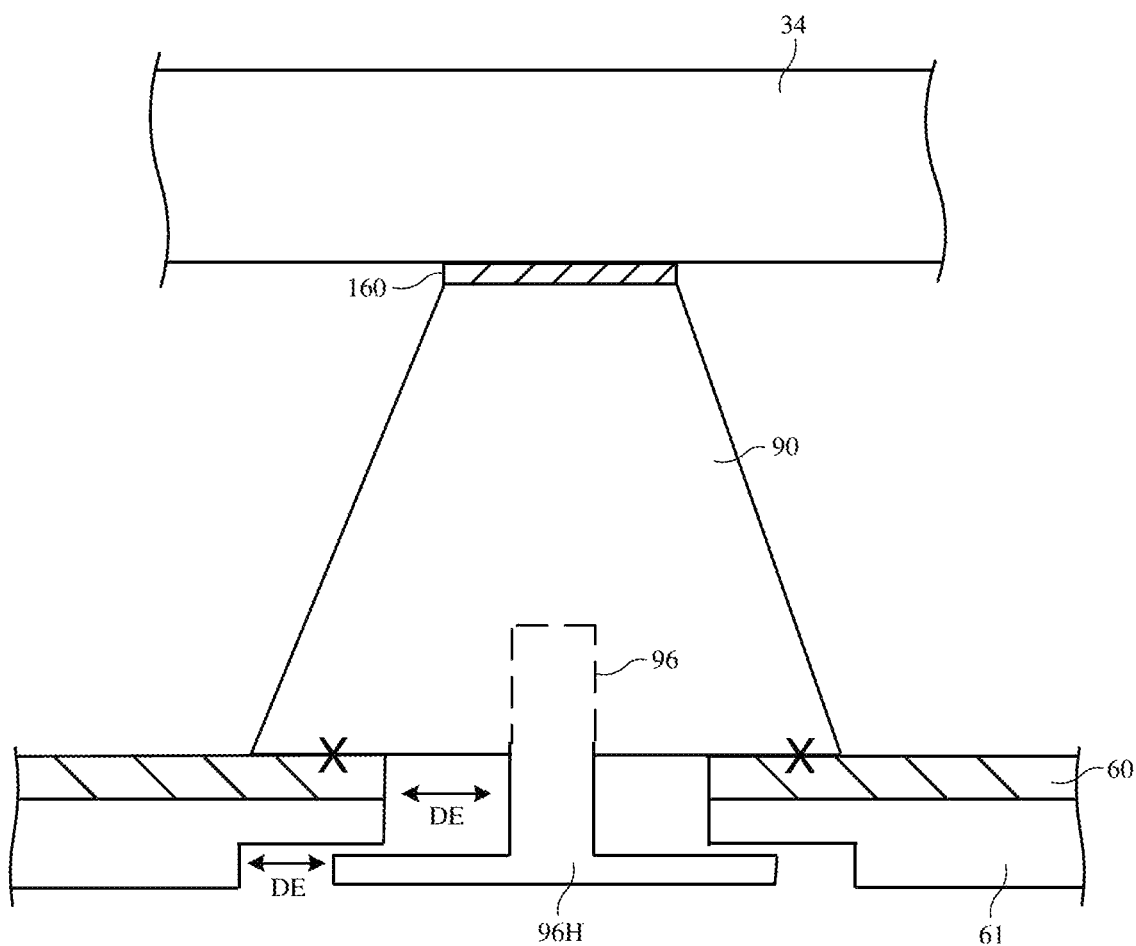
FIG. 12 is a cross-sectional side view of an illustrative support post for a backlight unit coupled to a substrate with a floating connection in accordance with an embodiment.

FIG. 12 shows how a floating coupling structure may be formed using screw 96. Screw 96 may be provided with a head portion 96H that is sufficiently wide to capture portions of printed circuit 60 and optional metal chassis 61. As shown in FIG. 12, screw 96 may be separated by lateral space DE from printed circuit 60 and chassis 61 to accommodate coefficient of thermal expansion mismatch, as described in connection with space DE of FIG. 10. A portion of opening 102 in chassis 61 may, if desired, be recessed to accommodate portion 96H of screw 96.

Figure 13:
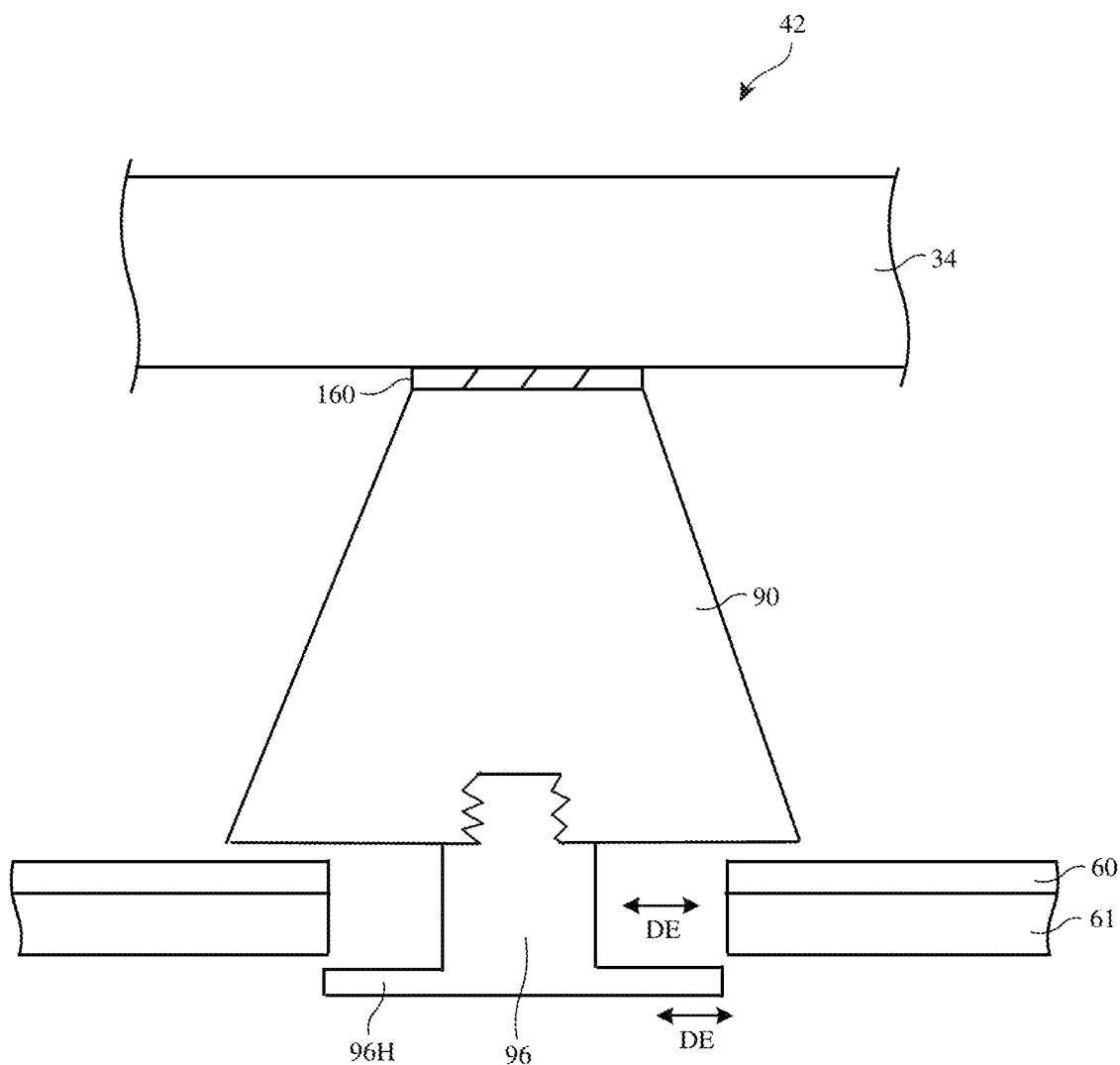
FIG. 13 is a cross-sectional side view of an illustrative support post for a backlight unit coupled to a substrate with a floating connection in accordance with an embodiment.

Another illustrative support post configuration with opposing ends having fixed and floating connections is shown in FIG. 13. In the configuration of FIG. 13, the outer portion of support post portion 96H of screw 96 captures printed circuit 60 and an unrecessed portion of optional chassis 61 and also has been arranged to accommodate lateral motion (see, e.g., space DE).

When using an adhesive layer (e.g., adhesive layer 160) to attach post 90 to light diffuser 34 and floating coupling structures with lateral spaces DE to accommodate relative lateral movement of substrate layer(s) such as printed circuit 60, post 90 has a fixed upper connection and a floating lower connection. This configuration helps maintain the flatness of diffuser 34, so that height H may be minimized (e.g., to a value of 2-4 mm, at least 2 mm, at least 2.5 mm, less than 5 mm, less than 4 mm, less than 3.5 mm, or other suitable value) and so that the spacing between light sources 38 (e.g., the lateral dimensions of cells 38C) may be about 15-25 mm, at least 12 mm, or less than 30 mm (as examples).

The foregoing is merely illustrative and various modifications can be made to the described embodiments. The foregoing embodiments may be implemented individually or in any combination.

What is claimed is:

1. A display, comprising:
an array of pixels configured to display images; and
a backlight configured to produce backlight illumination for the array of pixels, wherein the backlight has a two-dimensional array of cells that each includes a light source and a reflector, a printed circuit on which the light sources are mounted, a diffuser, and support posts that extend between the printed circuit and the diffuser to support the diffuser, and floating coupling structures, wherein the two-dimensional array of cells extends in first and second directions, wherein the support posts each has a first portion that is coupled to the diffuser and a second portion that is coupled to the printed circuit, and wherein the floating coupling structures couple the second portion of each support post to the printed circuit while allowing the second portion to shift relative to the printed circuit in at least one direction selected from the group of the first direction and the second direction to accommodate a thermal coefficient of expansion mismatch between the diffuser and the printed circuit.

2. The display defined in claim 1 further comprising a layer of adhesive that attaches the first portion of each support post to the diffuser.

3. The display defined in claim 2 wherein the coupling structures include a first member and a second member and wherein the second portion is captured between the first member and the second member.

4. The display defined in claim 3 wherein the first and second members are metal plates.

5. The display defined in claim 4 wherein the printed circuit has solder pads and wherein the second member is attached to the solder pads with solder.

6. The display defined in claim 5 wherein the second portion is wider than the first portion.

7. The display defined in claim 5 wherein the second portion comprises a sacrificial alignment structure configured to mate with an opening in the second member.

8. The display defined in claim 7 wherein the support posts comprise polymer.

9. The display defined in claim 3 wherein the floating coupling structures include a plate with openings.

10. The display defined in claim 9 wherein the support posts each has a sacrificial alignment structure configured to be received within a respective one of the openings.

11. The display defined in claim 10 wherein the floating coupling structures comprise a member that is attached to the plate, wherein the plate and the member are configured to capture a portion of each support post while allowing that support post to move relative to the printed circuit.

12. A display, comprising:
an array of pixels configured to display images; and
a backlight configured to produce backlight illumination for the array of pixels, wherein the backlight has a two-dimensional array of cells that each includes a light source and a reflector, a printed circuit on which the light sources are mounted, a diffuser, and an array of support posts that are configured to separate the diffuser from the printed circuit, wherein the support posts are interposed between and separate the reflectors of adjacent cells in the two-dimensional array of cells, wherein the support posts have opposing first and second ends, and wherein the first ends are coupled to the diffuser with adhesive.

13. The display defined in claim 12 further comprising coupling structures that are configured to couple the second ends of the support posts to the printed circuit while allowing the second ends of the support posts to shift position relative to the printed circuit.

14. The display defined in claim 13 wherein the coupling structures include first and second members with portions that are separated from each other by a gap, wherein the second ends of the support posts are received within the gaps.

15. The display defined in claim 12 wherein the support posts include inner and outer support post portions.

16. The display defined in claim 12 wherein the second ends of the support posts are coupled to the printed circuit with respective screws.

17. The display defined in claim 16 wherein the screws are configured to allow the second ends of the support posts to shift position relative to the printed circuit.

18. A display, comprising:
an array of pixels configured to display images; and
a backlight configured to produce backlight illumination for the array of pixels, wherein the backlight has a two-dimensional array of cells that each includes a light source and a reflector, a printed circuit on which the light sources are mounted, and a diffuser and wherein the backlight has support posts that are configured to separate the diffuser from the printed circuit, wherein the support posts each has a first portion and a second portion, wherein the first portion is attached to the diffuser with a fixed connection and wherein the second portion is attached to the printed circuit with a floating connection that couples the support post to the printed circuit while allowing the second portion to shift in a direction planar to the two-dimensional array of cells.

19. The display defined in claim 18 wherein the floating connection has first and second members with portions that are spaced apart from each other to capture the second portions while accommodating movement of the second portions relative to the printed circuit.

\* \* \* \* \*